May 16, 1950          J. J. BRELL          2,508,217
FISHING REEL
Filed May 18, 1946
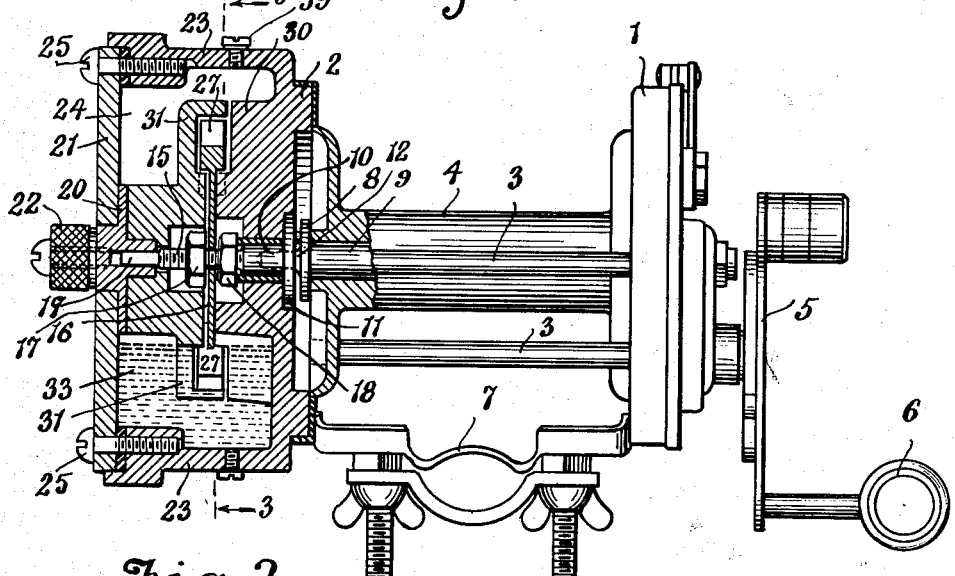
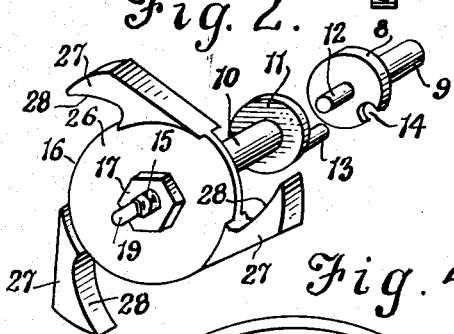
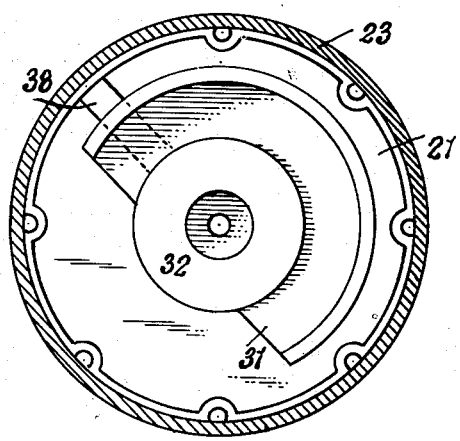
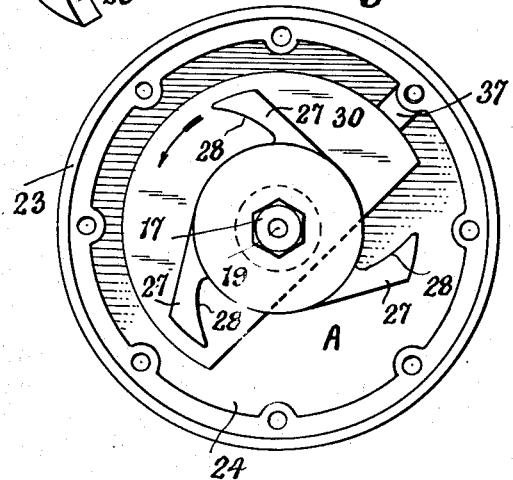
INVENTOR.
Jules J. Brell
BY Harry Radzinsky
Attorney Patented May 16, 1950

2,508,217

UNITED STATES PATENT OFFICE 2,508,217

FISHING REEL

Jules J. Brell, Baldwin, N. Y., assignor of fifteen per cent to Harry Radzinsky, New York, N. Y.

Application May 18, 1946, Serial No. 670,666

5 Claims. (Cl. 242—84.5)

This invention relates to fishing reels and has for its primary object the provision of a reel in which tangling, or so-called "backlash" of the line during the casting operation is eliminated.

One of the objections inherent in all fishing reels is the tendency of the fishing line to tangle or backlash during casting. Backlashing is caused by the spool of the reel rotating considerably faster than the forward speed of the sinker at the end of the line at a certain time during a cast, with the result that upon slack being created in the line due to the too rapid unreeling of the same from the spool, the slack part of the line will wind or wrap itself around the reel in a tangled mass, the untangling of which is vexatious and a trial to even the most patient and ardent angler.

Efforts have been made in the past to provide reel constructions and attachments in which the tendency of the fishing line to backlash would be either materially reduced or else completely eliminated, and with mediocre results. Such efforts have primarily consisted in utilizing devices of various kinds by which the rotating speed of the spool of the reel would be "braked," or materially reduced, as the forward speed of the sinker slowed down. Most of these known devices could not be regulated or controlled according to the force employed by persons of various skills, strengths and casting ability, with the result that they were reasonably successful with some individuals and wholly unsuccessful with others. Another objection found in many of the prior devices which sought to overcome backlashing, was that such devices tended to materially decrease the length of the cast, the same often acting to so "brake" the spool of the reel that they acted as an impediment to forward movement of the sinker and thus so restricated the efforts of the fisherman and reduced the length of his cast, that he often discarded the reel, or its so-called "anti-backlash" attachment preferring to attempt to reduce backlashing by acquiring skill in "thumbing" the reel to thereby reduce its speed when needed and to endeavor to prevent backlash.

With knowledge of the failure of prior art devices in this art to effectively eliminate backlashing, the present invention seeks to secure that desirable result by a new and more elastic medium heretofore employed for the purpose, namely, by the utilization of a fluid in a closed chamber, and in which a rotor, coupled to the spool of the reel, is rotated during the casting operation. It has been found that by a construction of this character, wherein the rotor is propelled through a fluid medium, such as water, in a closed chamber, a resistance is set up to rotation of the spool of the reel which, while serving to "brake" the spool and decrease its rotation, it will nevertheless do so in such a manner that the length of the cast is unappreciably decreased, yet the rotation of the spool is decreased to an extent necessary to maintain a balance between the rotative movement of the spool and the forward movement of the sinker, thereby keeping the line taut during the entire length of the cast and preventing slackness and resultant backlashing.

An object of the invention is to provide in a device of this character, a novel arrangement of rotor-containing chamber, wherein the rotor that is coupled to the spool is rotated through both wide and narrow portions of the chamber, with a fluid caused to exert pressure against the rotor in the wide portion of the chamber by confinement of the fluid therein during rotation of the spool. Another object of the invention is the provision of a regulatable means by which the extent of braking force exerted on the reel during the cast can be readily adjusted to meet the needs of individual caster.

These and other objects are accomplished by the invention, a more particular description of which will appear hereinafter and be set forth in the claims appended hereto.

In the accompany drawing, wherein an illustrative embodiment of the invention is disclosed, Fig. 1 is an elevational view of a fishing reel embodying the invention, one end of the reel in which the improvements are incorporated, being shown in section; Fig. 2 is an isometric view of the rotor and means by which the same is coupled to the spool of the reel; Fig. 3 is a sectional view taken approximately on the line 3—3 of Fig. 1, looking in the direction of the arrows, the rotor and its shaft being omitted to more clearly show the construction of the rotor housing; and Fig. 4 is a view of the end of the rotor housing with the cover plate and a portion of the rotor enclosure removed to more clearly show the construction of the rotor.

Referring to the drawing, 1 indicates one of the ends of the frame of the reel, the second end being indicated at 2, these end portions of the frame of the reel being connected in the conventional manner by the rods 3. In the end member 1 is contained the conventional gearing, the drag, and other elements common to the usual type of reel and forming no part of the present invention. The winding crank is shown at 5, the same terminating in the usual handle 6. At 7 is shown the clamp by means of which the reel is detachably secured to the fishing rod.

The spool of the reel is shown at 4, the same being of conventional form and being driven in the usual way by the gearing contained in the end 1 of the body of the reel. At one of its ends, the spool 4 is provided with a disk 8, extending from a stem 9 which is rigidly secured in the central axial passage of the spool so that the disk 8 is for all purposes, a part of the spool 4. This disk 8 and its associated elements constitutes a coupling means by which the spool 4 is coupled to the anti-backlash mechanism to be described.

Rotatively mounted in the end member 2 of the body of the reel is a spindle 10 which is provided at one end with a disk 11 having a central recess for the reception of a centrally located stud 12, projecting from the coupling disk 8 carried by the spool 4. The disk 11 on the spindle 10 carries an off-center or eccentrically-positioned stud or pin 13 which enters into a notch 14 provided in the edge of the disk 8 when the two disks 8 and 11 are brought together, and the stud 12 enters into the central recess provided in the disk 11. By the engagement of the parts 13 and 14 a driving connection is established between the spool 4 and the spindle 10, so it will be apparent that when the spool 4 is rotated, as it does when casting, the spindle 10, which carries a rotor 16 to be described, will also be rotated at the same speed as the spool 4.

The spindle 10 is provided with a threaded portion 15 on which is located the rotor 16, the same being held on the threaded portion of the spindle 10 by means of the nuts 17, 18 which clamp the rotor 16 between them. The end portion 19 of the spindle 10 is rotatively supported in a suitable adjustable bearing 20 mounted in a cover plate 21 and held in position by the nut 22.

The end member 2 of the reel is so shaped as to constitute a rotor chamber, and is thus provided with a circumferentially extending side wall 23 extending completely around it, the chamber 24 thus formed, being closed by the cover plate 21, which is secured to the wall 23 by means of the screws 25 or other equivalent fastening means.

The rotor 16 consists of a central disk-like hub 26 from which extend the radial vanes or blades 27. Three of these blades are shown, but it will be obvious that this number may be increased or decreased. The entering face of each of the vanes or blades 27 is curved or concaved, substantially as shown at 28, to facilitate effective operation of the rotor as will be described. For a substantial portion of its rotation, the rotor rotates in an enclosure, which fits closely around the blades 27, the construction of the enclosure being more clearly shown in Figs. 3 and 4. It will be therein observed, that a portion of the rotor enclosure consists of a segmental plate 30, formed as a part of the end member 2 of the reel. The cooperating portion of the enclosure is shown at 31 and the same is of cupped formation and is positioned with its concave face directed toward the plate 30, as more clearly seen in Fig. 1, the two portions 30 and 31 cooperating to form an arcuate passage through which the rotor is moved for a portion of each revolution. The portion 31 is provided with a hub 32 which engages over a part of the bearing 20 and to which it may be secured if desired. This arrangement is such that when the cover plate 21 is removed by the removal of the screws 25, the bearing 20 as well as the enclosure member 31 may be lifted out, thus exposing the end of the spindle 10 and the nut 17 thereon. By loosening the nut 17, the rotor may be removed.

In the use of the reel, the chamber 24 is partly filled with a liquid, which can be water, oil or other suitable fluid, indicated at 33 in Fig. 1. It is to be noted that the portion of the chamber 24 in which the fluid will normally collect when the reel is held in proper position at the start of a cast, is that designated at A in Fig. 4, or in other words, is that part of the chamber wherein the rotor enclosure is cut away or omitted.

As the cast is made, the spool 4 will rotate rapidly, the fishing line unreeling from the same, and due to the coupling of the spool to the spindle 10, the rotor 16 carried thereby will be caused to rotate at a speed equal to that of the spool 4, the rotor spinning within the fluid 33 containing within portion A of the chamber 24 of the reel. As the rotor revolves in the direction of the arrow in Fig. 4 it will tend to force some of the liquid with it in the same direction and the liquid will thus be forced toward the rotor enclosure composed of the parts 30, 31 surrounding the rotor for a portion of each revolution of the rotor. It will be noted that the movement of some of the liquid in the rotor enclosure portion A will be restricted by the fact that a barrier is provided between the peripheral edge of the rotor enclosure and the inner wall surface of the chamber 24. This barrier consists of the radially extending wall or baffle 37 which bridges the space between the edge of the plate 30 and the wall 23 of the chamber, and a similar wall or baffle 38 which extends between the part 31 of the enclosure and the wall 23. The arrangement described has been found to create pressure against the sides of each blade of the rotor as the blade passes through portion A of the rotor chamber and to thus effectively serve as a fluid braking means for the rapidly spinning spool to prevent the undesirable overrunning which results in backlash.

As the cast is made, the resistance of the liquid 39 against the vanes or blades of the rotor has been found to effectively keep the spool speed down to a speed which is co-extensive with the forward speed of the sinker at the end of the line. The result is that the line is held sufficiently taut during the entire period of the cast and prevented from the provoking patience-trying backlash so often encountered, by both the inexperienced and skilled fisherman alike.

Since the length of a cast, and resultantly the speed with which the sinker moves forwardly is determined by the "snap" with which the rod is operated by the skilled fisherman, it is obvious that some means must be provided by which the braking effect of the fluid on the rotor can be regulated to suit the individual fisherman. As the resistance to the rotor is determined by the quantity of fluid contained in the chamber 24, it is a relatively simple matter for the fisherman to readily determine the particular amount of fluid to be placed in the chamber 24 to suit his particular casting ability, namely, to enable him to secure a maximum length of cast and at the same time provide just the proper braking effect on the spool of the reel to maintain the same at the speed equal to the forward speed of the sinker during the cast, and thus preventing backlash. Thus by merely altering the amount of fluid in the chamber a braking effect to suit the skill of the fisherman, the weight of the fishing tackle used and other factors may be readily secured.

To enable the chamber 24 to be filed, a filler plug 39 is provided and a drain plug 40 allows the chamber to be readily emptied. The fluid employed in the chamber may be water or any other available fluid and preferably one of a fluidity substantially equal to water. The cover plate 21 may be composed of a transparent material, such as "Lucite" or the equivalent, if desired, so that the quantity of liquid placed in the chamber 24 may be noted through the cover plate. Graduations may be placed on the cover plate to enable the user to repeatedly fill the chamber to a known extent, or to the extent which will meet his particular casting requirements.

What I claim is:

1. In a fishing reel, a spool mounted for rotation during a cast, a rotor attached at one end of the spool, said rotor having radially-extending blades, a crank coupled to the other end of the spool, a chamber enclosing the rotor remote from the crank and in which the rotor is rotated upon rotation of the spool, said chamber including a central segmental portion provided with an arcuate open-ended passage closely conforming to the blade-shape of the rotor, said arcuate passage enclosing each blade of the rotor, and a liquid contained in and partly filling the chamber and having its entry into the passage impeded by the relatively close conformation of the shape of the rotor blades to the interior of said passage.

2. In a fishing reel as provided for in claim 1, wherein the chamber is provided with a circumferential wall spaced from the segmental portion, and a radial barrier is provided between the circumferential wall and the segmental portion to thereby impede the flow of the liquid between said wall and segmental portion in the direction of rotation of the rotor.

3. In a fishing reel, a frame, a spool rotatively mounted in the frame, a crank, drive means coupling the spool to the crank, a closed chamber at one end of the frame, remote from the drive means, a rotor mounted in said chamber, means for coupling the spool to the rotor whereby said rotor will be rotated upon rotation of the spool, said chamber having an arcuate passage of a cross-sectional shape closely conforming to the cross-sectional shape of the rotor and through which the rotor is moved through a substantial portion of each of its revolutions, the chamber having an enlarged portion at the ends of said passage through which the rotor is moved for a portion of each of its revolutions, and a liquid normally contained in said enlarged portion of the chamber and through which the rotor is moved.

4. In a fishing reel, a frame, a spool rotatively mounted in the frame, a crank, drive means therefrom to the spool, a cylindrical chamber at one end of the spool, a shaft coupled to the spool and extending across the chamber, a bladed rotor on said shaft within the chamber, an arcuate passage within the chamber through which the rotor is moved for a portion of each revolution, said passage being open at its ends, the portion of the chamber between the ends of the passage being wider than the cross-sectional width of the passage, and a liquid contained in said wider portion of the passage and through which the rotor is moved.

5. In a fishing reel, a frame, a spool rotatively mounted in the frame, a crank, drive means therefrom to the spool, a cylindrical chamber at one end of the spool, said chamber being provided with a circumferential side wall, an arcuate channel within the chamber located inwardly from the side wall thereof, a shaft coupled to the spool and extending across the chamber, a bladed rotor on said shaft within the chamber and having its blades movable through the arcuate channel for more than one-half of each rotation of the rotor, the shape of said channel conforming closely to the blade portions of the rotor, the channel being open at its ends, the portion of the chamber between the open ends of the channel being wider than the channel, a liquid contained in said wider portion of the chamber, and a baffle between the channel and the circumferential wall of the chamber for preventing movement of the liquid between the chamber and the circumferential wall of the chamber when the rotor is moved through the liquid.

JULES J. BRELL.

REFERENCES CITED

The following references are of record in the file of this patent:

UNITED STATES PATENTS

| Number | Name | Date |
|---|---|---|
| 1,985,889 | La Mater et al. | Jan. 1, 1935 |
| 2,419,372 | Schneider | Apr. 22, 1947 |

FOREIGN PATENTS

| Number | Country | Date |
|---|---|---|
| 15,670 of 1910 | Great Britain | Apr. 13, 1911 |